United States Patent [19]
Souder et al.

[11] Patent Number: 5,937,414
[45] Date of Patent: Aug. 10, 1999

[54] METHOD AND APPARATUS FOR PROVIDING DATABASE SYSTEM REPLICATION IN A MIXED PROPAGATION ENVIRONMENT

[75] Inventors: Benny Souder, Belmont; Harry Sun, Redwood City; Alan Downing, Fremont; Lip Boon Doo; James Stamos, both of San Jose; Peter Lim, Redwood Shores, all of Calif.

[73] Assignee: Oracle Corporation, Redwood Shores, Calif.

[21] Appl. No.: 08/808,522

[22] Filed: Feb. 28, 1997

[51] Int. Cl.$^6$ .................................................. G06F 17/00
[52] U.S. Cl. .......................... 707/203; 707/202; 707/204
[58] Field of Search .............................. 707/10, 202, 203, 707/204, 205; 711/117; 395/200.43, 500, 489, 182.18, 444

[56] References Cited

U.S. PATENT DOCUMENTS

| | | | |
|---|---|---|---|
| 5,333,312 | 7/1994 | Wang | 707/10 |
| 5,440,727 | 8/1995 | Bhide et al. | 711/117 |
| 5,561,809 | 10/1996 | Elko et al. | 395/200.43 |
| 5,596,744 | 1/1997 | Dao et al. | 707/10 |
| 5,720,029 | 2/1998 | Kern et al. | 395/182.18 |
| 5,724,556 | 3/1998 | Souder et al. | 395/500 |
| 5,742,792 | 4/1998 | Yanai et al. | 395/489 |

*Primary Examiner*—Wayne Amsbury
*Assistant Examiner*—Thuy Pardo
*Attorney, Agent, or Firm*—McDermott, Will & Emery

[57] ABSTRACT

A method and apparatus for replicating data among sites is provided. The method allows changes to the same body of data to be replicated synchronously to some destination sites and asynchronously to other destination sites. Such mixed propagation configurations allow synchronous updating to selected remote copies of replicated data where data integrity is a high priority, and asynchronous propagation to remaining copies of replicated data in order to allow transactions to be committed locally regardless of whether the transaction is committed at a remote copy of the replicated data. The propagation mode is selectable by a user on a site-to-site basis for each replicated body of data, thus providing a mix of availability and consistency that is not possible in purely synchronous or purely asynchronous replication systems.

22 Claims, 5 Drawing Sheets

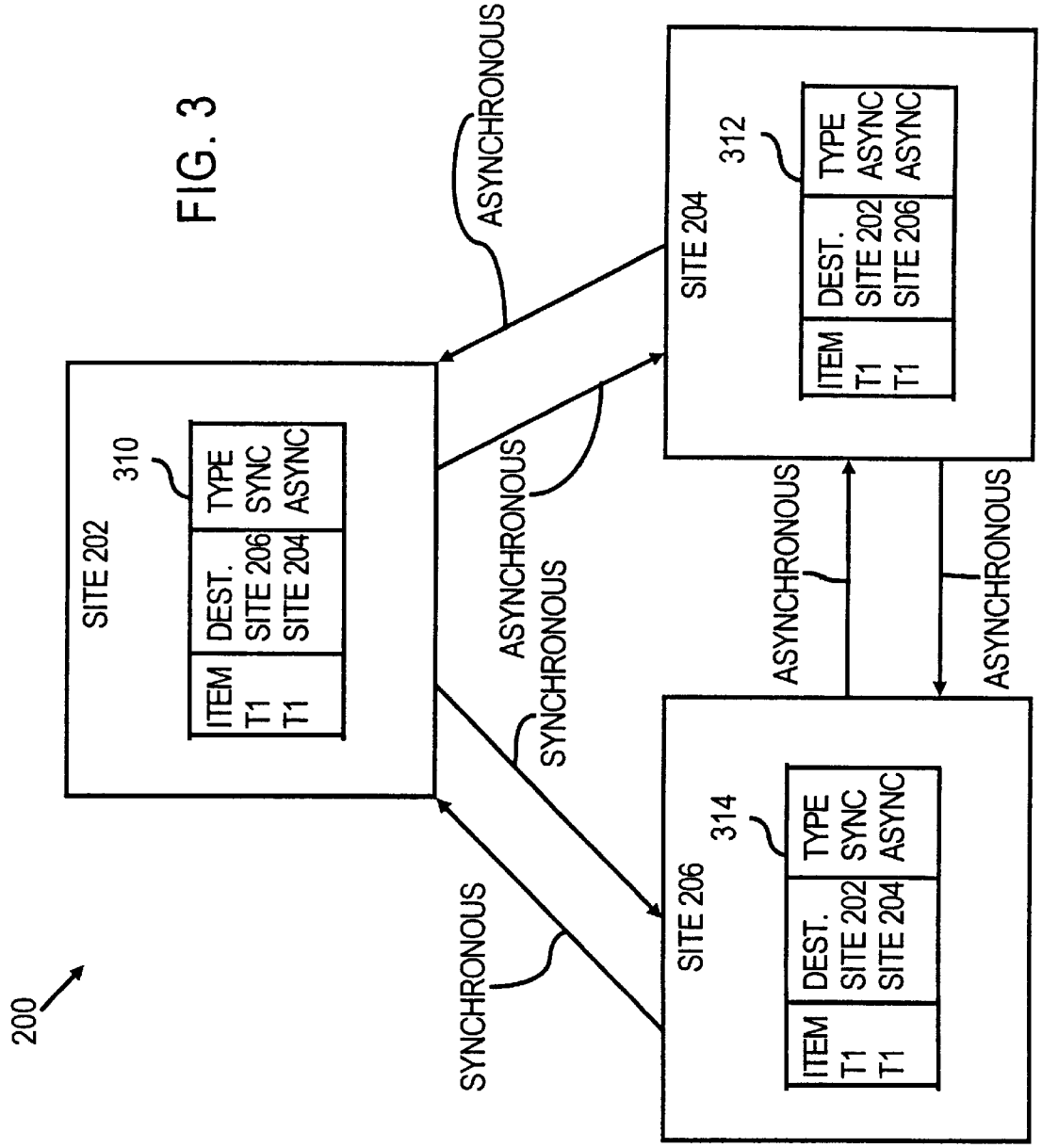

METHOD AND APPARATUS FOR PROVIDING DATABASE SYSTEM REPLICATION IN A MIXED PROPAGATION ENVIRONMENT

FIELD OF THE INVENTION

The present invention relates to database systems, and more particularly to techniques for propagating changes from one site to another.

BACKGROUND OF THE INVENTION

Under certain conditions, it is desirable to store copies of a particular set of data, such as a relational table, at multiple sites. If users are allowed to update the set of data at one site, the updates must be propagated to the copies at the other sites in order for the copies to remain consistent. The process of propagating the changes is generally referred to as replication.

The site at which a change is initially made to a set of replicated data is referred to herein as the source site. The sites to which the change must be propagated are referred to herein as destination sites. If a user is allowed to make changes to copies of a particular table that are at different sites, those sites are source sites with respect to the changes initially made to their copy of the table, and destination sites with respect to the changes initially made to copies of the table at other sites.

Two types of replication systems are in use today: synchronous replication systems and asynchronous replication systems. In synchronous replication systems, no change by a transaction is considered permanent until all changes made by the transaction are successfully applied at the source site and at all of the relevant destination sites. A technique known as two-phase commit may be used to ensure the proper operation of synchronous replication operations. Two-phase commit is generally described in "Notes on Data Base Operating Systems", Gray, J. N., IBM Res. Rep. RJ2188 (Feb. 1978), "Operating Systems: An Advanced Course", R. Bayer, R. M. Graham, and G Seegmuller, Eds., Springer-Verlag, Berlin and New York, 1979 p.p. 393–481, and U.S. Pat. No. 5,452,445 entitled "Two-Pass Multi-Version Read Consistency", filed on Apr. 3, 1992 and issued to Hallmark et al. on Sep. 19, 1995, the contents of which are incorporated herein by reference.

Asynchronous replication systems separate the task of making the changes at the source site from the task of making changes at the destination sites. Changes made by a transaction are made permanent at a source site without respect to whether the changes have been made permanent at any of the relevant destination sites. Typically, records of the changes are simply stored in a queue at the source site, to be propagated to and applied at the destination sites at a later time. One mechanism for performing asynchronous replication is described in U. S. patent application Ser. No. 08/126,586 entitled "Method and Apparatus for Data Replication", filed on Sep. 24, 1993 by Sandeep Jain and Dean Daniels, (hereinafter "Jain"), the contents of which are incorporated by reference.

Relative to asynchronous replication systems, synchronous replication systems have the advantage that all replicated copies are always up-to-date and identical. In contrast, replicated copies at some sites in asynchronous systems may contain data that has already been superseded at other sites. Further, in asynchronous systems it is possible for events at destination sites to make it impossible for certain changes to be replicated at the destination sites. Because the changes have already been made permanent at the source site, asynchronous systems must provide some mechanism for conflict detection and resolution, such as that described in U.S. patent application Ser. No. 08/618,507 entitled "Configurable Conflict Resolution in a Computer Implemented Distributed Database", filed by Souder et al. On Mar. 19, 1996, (hereinafter "Souder"), the contents of which are incorporated herein by reference.

Asynchronous systems have an advantage over synchronous replication systems in that asynchronous systems allow data to be committed at the source site sooner than in synchronous systems. Specifically, each operation that changes replicated data in asynchronous systems does not have to be preceded by the handshaking operations between the source and destination sites that are required in synchronous systems. Further, changes may be made permanent at a source site in an asynchronous system even though one or more of the destination sites is not currently available. This is particularly important when one or more sites in the replication system will be disconnected from the system on a reoccurring basis, such as when the host for one of the sites is a portable computer.

Synchronous systems and asynchronous systems represent two extremes in the trade-off between consistency and availability. Synchronous systems enforce absolute consistency, but cannot operate well in networks where sites may not always be available. Asynchronous systems continue working when sites become disconnected and reconnected. However, this availability is gained at the expense of data consistency between the sites.

Based on the foregoing, it is desirable to provide a mechanism which allows users to select a replication configuration that embodies a balance between availability and consistency according to the needs of their specific system. It is desirable to provide a system that allows users to rely on the consistency of synchronous replication where consistency is required, and enjoy the availability of asynchronous replication where such availability is required.

SUMMARY OF THE INVENTION

A method and apparatus for replicating data among sites is provided. The method allows changes to the same body of data to be replicated synchronously to some destination sites and asynchronously to other destination sites. Such mixed propagation configurations allow synchronous updating to selected remote copies of replicated data where data integrity is a high priority, and asynchronous propagation to remaining copies of replicated data in order to allow transactions to be committed locally regardless of whether the transaction is committed at a remote copy of the replicated data. The propagation mode is selectable by a user on a site-to-site basis for each replicated body of data, thus providing a mix of availability and consistency that is not possible in purely synchronous or purely asynchronous replication systems.

A body of data that is periodically refreshed to mirror the contents of another body of data is referred to as a snapshot. According to another aspect of the invention, updatable snapshots are provided where the user is able to specify whether the updates to the snapshot are replicated asynchronously or synchronously back to the site from which the snapshot data originates. When synchronous propagation is used to propagate updates made to the snapshot, no updates are lost in the periodic refresh operations performed on the snapshot.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 is a block diagram illustrating the propagation mode information that may be used to record the propagation modes that are in effect between the sites in the system of FIG. 2;

DETAILED DESCRIPTION OF THE PREFERRED EMBODIMENT

Mixed (asynchronous and synchronous) replication configurations are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
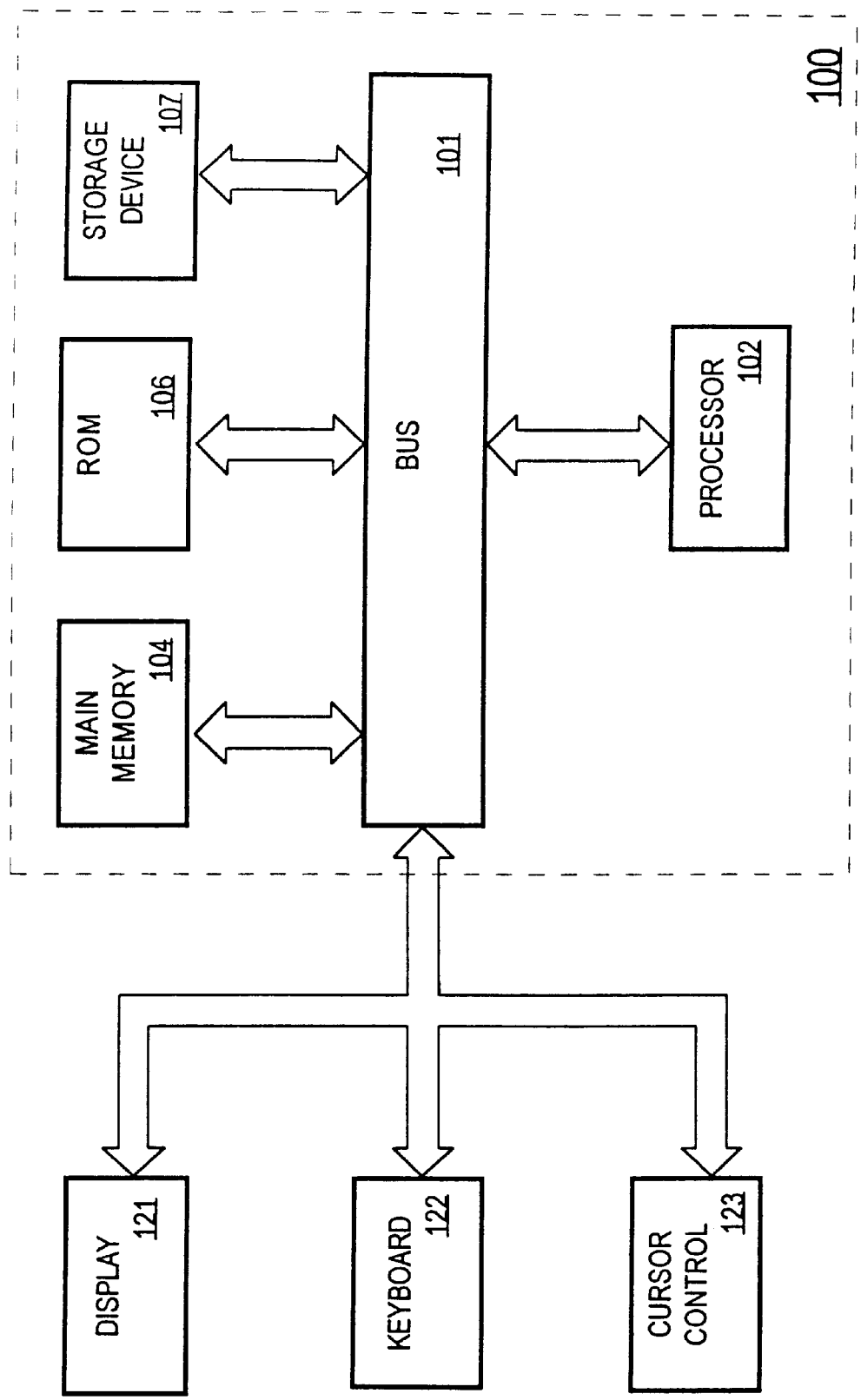
FIG. 1 is a block diagram of a computer system which may be used to implement an embodiment of the invention.

Referring to FIG. 1, it is a block diagram of a computer system 100 upon which an embodiment of the present invention can be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. Computer system 100 further includes a keyboard 122 and a cursor control 123, such as a mouse.

The present invention is related to the use of computer system 100 to provide a mixed propagation system. According to one embodiment, replication is performed by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the present invention. Thus, the present invention is not limited to any specific combination of hardware circuitry and software.

MIXED PROPAGATION

According to an embodiment of the invention, a mechanism is provided which allows replication systems to mix synchronous propagation with asynchronous propagation on a per replicated data per destination site basis. Thus, a particular body of replicated data (T1) may, in response to being modified at one site (S1), be propagated asynchronously to some destination sites and synchronously propagated to other destination sites. In addition, the propagation mode for a particular body of data does not have to by symmetric between two sites. Thus, changes made to T1 at site S1 may be propagated synchronously to a site S2, while changes made to T1 at S2 may be propagated asynchronously to site S1.

Mixed propagation configurations provided by the present invention allow synchronous updating to selected remote copies of replicated data where data integrity is a high priority, and asynchronous propagation to remaining copies of replicated data in order to allow transactions to be committed locally regardless of whether the transaction is committed at a remote copy of the replicated data.

According to one embodiment, asynchronous replication is performed in a mixed configuration using the replication techniques described in Jain. Synchronous replication may be performed in a mixed configuration using the replication techniques described U.S. Pat. No. 5,452,445 entitled "Two-Pass Multi-Version Read Consistency", filed on Apr. 3, 1992 and issued to Hallmark et al. on Sep. 19, 1995, and/or the techniques described in Jain modified such that changes are propagated immediately rather than being placed in update queues and such that changes are not made permanent until the source site and all synchronous destination sites report that the changes have been successfully applied. Two phase commit techniques may be employed to implement the latter modification.

EXEMPLARY MIXED PROPAGATION SYSTEM

Figure 2:
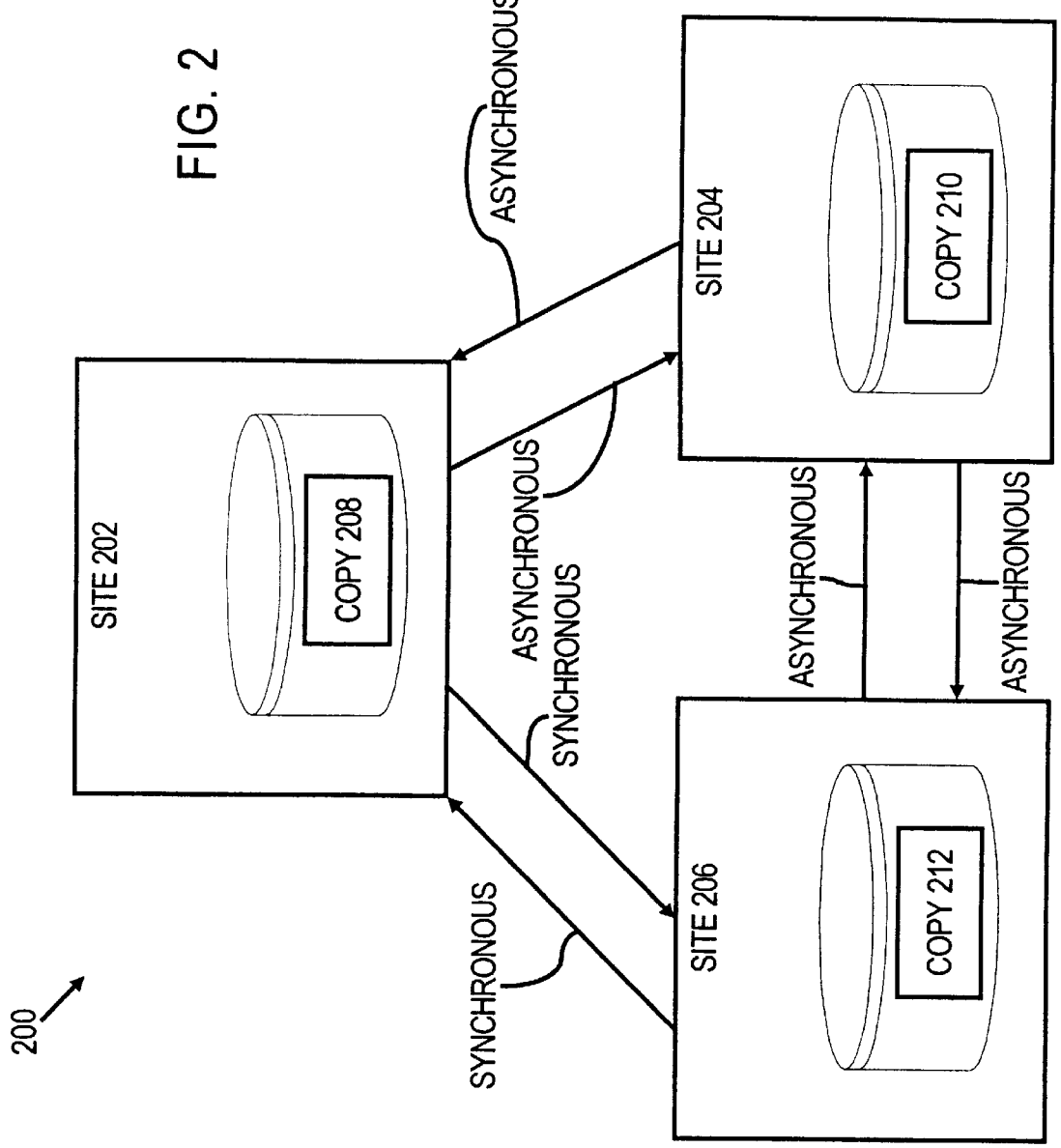
FIG. 2 is a block diagram of an exemplary mixed propagation replication system.

FIG. 2 illustrates an exemplary mixed propagation system. Referring to FIG. 2, a mixed propagation system 200 includes three sites 202, 204 and 206. Sites 202, 204 and 206 each have copies 208, 210 and 212 of the same body of data. The body of data may be, for example, a table in a relational database.

With respect to that particular body of data, site 202 is configured to synchronously propagate to site 206 changes made to copy 208, and asynchronously propagate to site 204 changes made to copy 208. Similarly, site 206 is configured to synchronously propagate to site 202 changes made to copy 212, and asynchronously propagate to site 204 changes made to copy 212. Site 204 is configured to asynchronously propagate to both sites 202 and 206 changes made to copy 210.

When configured in this manner, a high degree of consistency is maintained between copies 208 and 212. The cost of this consistency is that sites 202 and 206 must be available to each other for changes to be made to either of copies 208 and 212. However, changes can be made to copies 208 and 212 when site 204 is not connected and operational. Further, changes can also be made at site 204 to copy 210 when site 204 is not connected to either of sites 202 and 206.

Under certain conditions, the replication configuration of system 200 is clearly preferable to a completely asynchronous or a completely synchronous system. Specifically, if sites 202 and 206 represent enterprise sites that are heavily accessed and always on-line, while site 204 represents a single laptop computer, then it is likely that most or all changes to the body of data will be made to copies 208 and 212. It is also likely that most people will access copies 208 and 212 to obtain information. Therefore, the consistency provided by synchronous replication is desirable as between sites 202 and 206. Further, the cost associated with synchronous replication is reduced relative to a purely synchronous system that includes sites 202, 204, and 206 due to the fact that sites 202 and 206 are less likely to become unavailable.

On the other hand, if site 204 is a laptop computer, there is a high likelihood that it will become unavailable on a relatively frequent basis. Because replication from other sites to site 204 is asynchronous, the unavailability of site 204 will not affect the ability to make changes to copies 208 and 212. Further, because replication from site 204 to the other sites is asynchronous, the user of the laptop can make changes to copy 210 without being connected to the larger network (i.e. while "off-line"). The changes will be propagated and applied to copies 208 and 212 at a later time when the laptop is once again connected to the network that includes site 202 and 206.

As configured in FIG. 2, system 200 allows copies 208 and 212 to contain data that is out-of-date with respect to changes made to copy 210 at site 204. If this is not acceptable, the replication type from site 204 to sites 202 and 206 may be changed to synchronous, while the replication type to site 204 from sites 202 and 206 remains asynchronous. As a result of this change, copies 208 and 212 will always reflect the latest data because any change made to copy 210 can only be made if the change is simultaneously made at sites 202 and 206.

PROPAGATION MODE DATA

In exclusively synchronous systems and exclusively asynchronous systems, each site involved in replication typically maintains data ("replication metadata") that indicates the destination sites for each body of data to be replicated. According to one embodiment of the invention, the replication metadata at each site is augmented to further include data to indicate the propagation mode (e.g. asynchronous or synchronous) to be used to propagate changes made to a particular body of data to each destination site.

For example, FIG. 3 illustrates propagation tables 310, 312 and 314 that may be used to store the replication metadata for the mixed propagation system 200 illustrated in FIG. 2. Referring to FIG. 3, site 202 stores data indicating that a particular body of data (T1) is to be replicated synchronously to destination site 206 and asynchronously to destination site 204. Site 206 stores data indicating that T1 is to be replicated synchronously to site 202 and asynchronously to site 204. Site 204 stores data indicating that T1 is to be replicated asynchronously to sites 202 and 206. This replication mode data may be inspected to determine which replication trigger should be invoked in a particular situation, as shall be described in greater detail hereafter.

REPLICATION TRIGGERS

A trigger is a procedure that is executed upon the modification (insert, delete, update) of a specified body of data. According to one embodiment, mixed propagation systems use triggers to initiate replication operations. For example, site 202 may have a trigger which causes changes to be synchronously propagated to site 206 and asynchronously propagated to site 204 when a change is made to copy 208. The use of triggers to perform replication is described, for example, in U. S. patent application Ser. No. 08/126,586 entitled "Method and Apparatus for Data Replication", filed on Sep. 24, 1993 by Sandeep Jain and Dean Daniels, the contents of which are incorporated by reference.

According to one embodiment, a trigger is generated for each replicated body of data at each site. For example, assume that a user specifies that a table T1 is going to be synchronously replicated from a site S1 to a site S2, and asynchronously replicated from site S2 to site S1. A trigger is generated and stored at site S1 which calls routines to synchronously propagate changes made to T1 to site S2. A second trigger is generated and stored at site S2 which calls routines to asynchronously propagate changes made to T1 to site S1.

When another replication site is added, existing triggers are updated. For example, assume that a site S3 is added, and that T1 is to be synchronously replicated from site S1 to S3 and from site S2 to S3, and asynchronously replicated from site S3 to S1 and from site S3 to S2. The first trigger for T1 stored at S1 is updated to include calls to routines for synchronously propagating changes from S1 to S3. The second trigger for T1 stored at S2 is updated to include calls to routines for synchronously propagating changes from S2 to S3. A trigger for T1 is generated at S3 for propagating changes asynchronously from S3 to S1 and S2 in response to modifications made to the copy of T1 located at S3.

Significantly, a single trigger may include calls to both routines for asynchronously propagating changes and routines for synchronously propagating changes. Thus, in the example given above, the trigger for T1 located at S2 makes calls to propagate changes synchronously to S3 and asynchronously to S1.

In a preferred embodiment, "inline" triggers are provided for common operations, such as asynchronous and synchronous propagation. For example, the trigger for T1 at S2 described above may be replaced by an inline trigger that (1) invokes an asynchronous inline routine and (2) invokes a synchronous inline routine. To enhance performance, such routines may comprise of compiled, directly-executable code. All specific information about an operation is passed to such inline triggers as input parameters. Thus, in response to a modification to T1 at S2, the inline trigger is passed parameters that include values which indicate (1) the change made to T1 and (2) the replication metadata that indicates that the changes should be propagated asynchronously to S1 and synchronously to S2.

PROPAGATION MODE CONVERSION

According to one embodiment of the invention, the propagation mode specified between a given source and a given destination for a particular body of data may be changed by the user. When such a change is made, certain operations are performed before the change goes into effect. For example, assume that modifications made to T1 on S1 are propagated asynchronously to S2. Assume further that the propagation mode is changed to synchronous. At the time the mode change is specified, the copy of T1 on S2 may not be identical to the copy on T1. Therefore, before synchronous propagation of T1 from S1 to S2 can begin, the copy of T1 on S2 must be brought up-to-date with respect to the copy of T1 on S1.

According to one embodiment, the copy of T1 on S2 is brought up-to-date by locking T1 on S1 to prevent updates, and then applying at S2 all updates to T1 that have been queued for propagation from T1 to S2. When the updates have been applied, T1 on S2 will reflect all changes made to T1 at S1. The trigger associated with T1 on S1 is updated to call the synchronous replication routines to propagate data to S2 in response to modifications to T1 at S1. T1 on S1 is then unlocked, allowing users to modify T1 on S1. All such subsequent modifications to T1 on S1 are propagated synchronously to S2.

When the propagation mode is changed from synchronous to asynchronous, there are no modifications that have been made permanent at the source site that are not already reflected at the destination site. However, it is possible for a transaction making an update at the source site to be in-progress. Therefore, an exclusive lock on the body of data at the source site is requested. When the exclusive lock is granted, there cannot be any active transactions that have made changes to the body of data at the source site. Therefore, it is safe to change the propagation mode to asynchronous propagation by revising the propagation trigger at the source site as appropriate.

FAILOVER SYSTEM

Figures 4A, 4B:
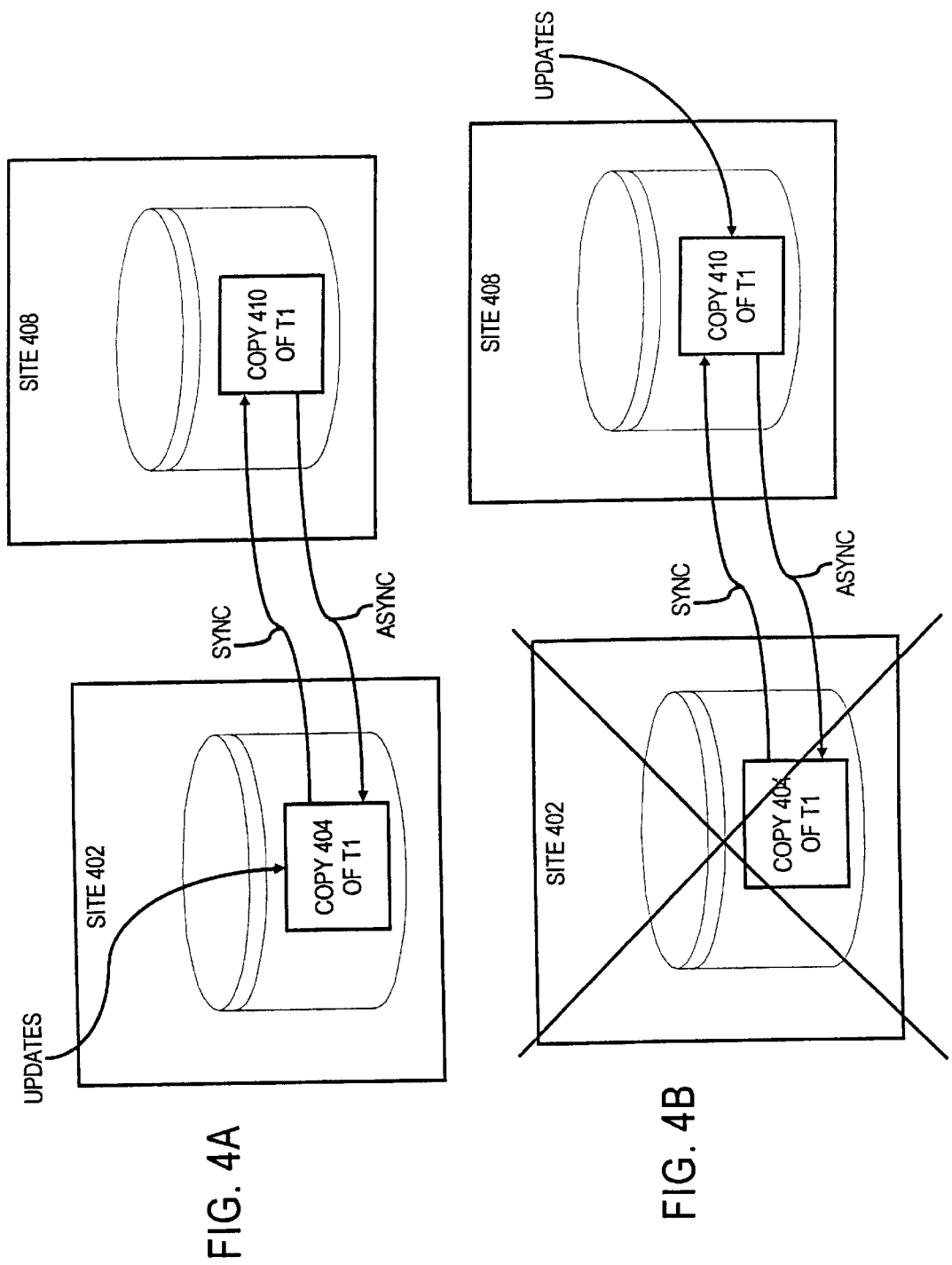
FIG. 4A is a block diagram of a failover system according to an embodiment of the invention.
FIG. 4B is a block diagram illustrating the system of FIG. 4A after a site has failed.

According to one embodiment of the invention, the ability to combine synchronous and asynchronous replication is used to provide a failover system 400, as illustrated in FIGS. 4A and 4B. Referring to FIG. 4A, it is a block diagram illustrating a system with two sites 402 and 408. Both sites contain copies of a body of data (T1). Changes made to the copy 404 at site 402 are synchronously propagated to site 408, while changes made to the copy 410 at site 408 are asynchronously copied to site 402.

Configured as shown, site 402 may be used as the target of all modifications to T1. Because such modifications are synchronously propagated to site 408, copies 404 and 410 will always reflect the most recent data. If site 402 fails for any reason, users can continue to access and update T1 by making changes to copy 410 at site 408. The ability to make changes to copy 410 while site 402 is unavailable is allowed because the asynchronous propagation mechanisms simply queue the changes that need to be propagated until the destination site becomes available. Once site 402 becomes available again, the changes made to copy 410 are propagated to site 402 and updates to T1 are once again performed at site 402 rather than site 408.

SNAPSHOTS IN MIXED PROPAGATION ENVIRONMENTS

A body of data that is periodically refreshed to mirror the contents of another body of data is referred to as a snapshot. The site containing the body of data that is mirrored by a snapshot is referred to herein as the master site. If users are allowed to modify the snapshot, the snapshot is referred to as an updatable snapshot. The snapshot may consist of only a specified subset of the data at the master site. For example, a snapshot may contain the data from the master site that satisfies a particular "select" statement associated with the snapshot.

Periodic refresh of a snapshot may be implemented by causing a trigger at the master site to log any changes made to data at the master site. At periodic intervals each snapshot site reads the log by, for example, issuing a query to the master site. Upon receiving the data specified in the query from the master site, the snapshot revises the snapshot to reflect any changes that had been made at the master site since the last refresh operation.

According to an embodiment of the invention, the trigger mechanisms described above are applied in the same manner to updatable snapshots as they are to other copies of replicated data. Thus, mixed propagation configurations may include one or more sites containing updatable snapshots, where the user is allowed to determine whether the changes made to each snapshot will be propagated synchronously or asynchronously back to the master site associated with the snapshot.

Figure 5:
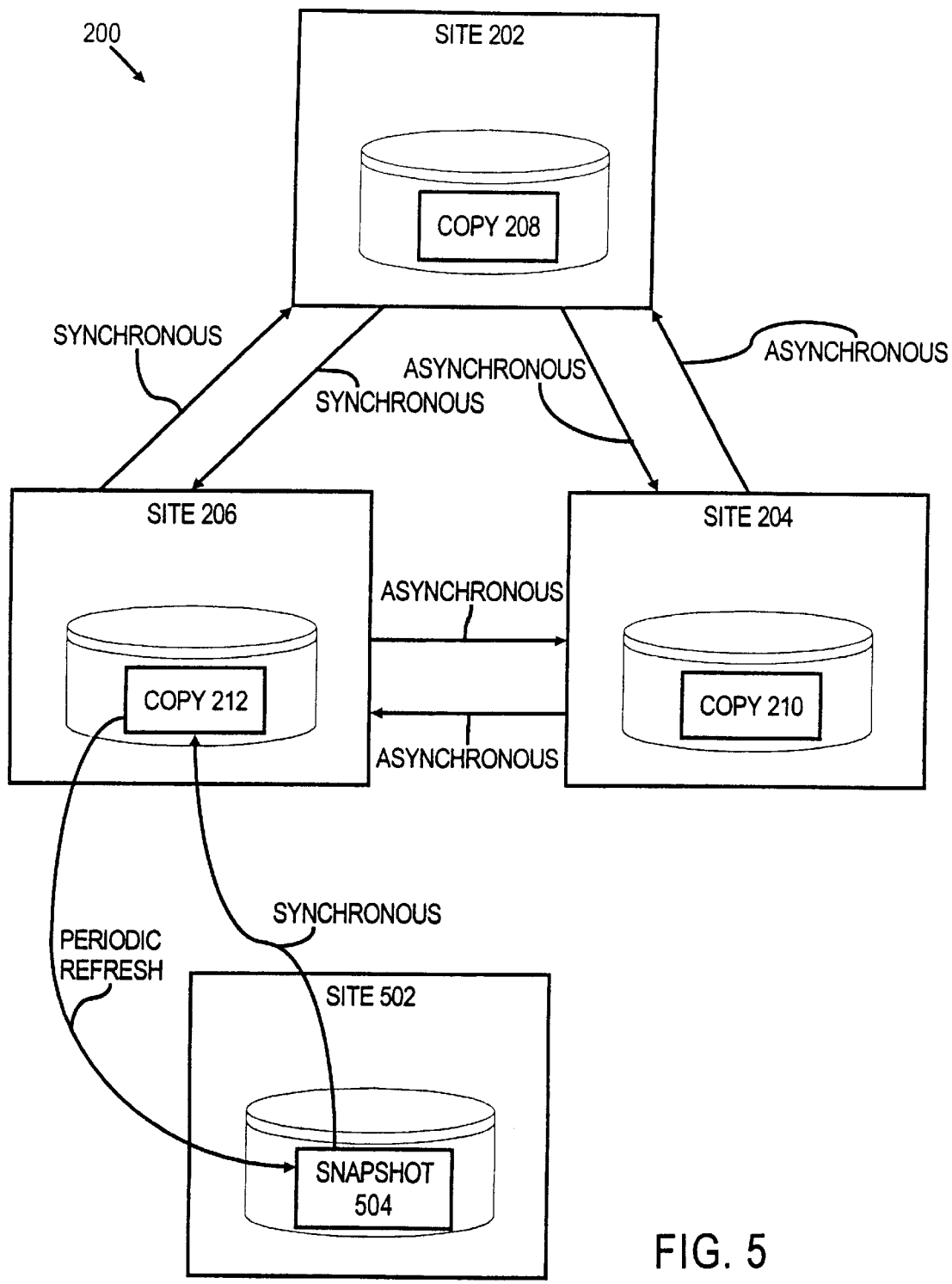
FIG. 5 is a block diagram illustrating an updatable snapshot according to an embodiment of the invention.

FIG. 5 is a block diagram of system 200 from FIG. 2 to which a snapshot site 502 has been added. At periodic intervals, snapshot 504 at site 502 is refreshed based on the contents of copy 212 at site 206. During the refresh operations, any changes made to the snapshot 504 that have not been applied at site 206 are overwritten. However, in the illustrated configuration the updates made to the snapshot 504 are synchronously propagated to the master site 206. Consequently, snapshot 504 will never reflect updates that have not been propagated to site 206, and refresh operations to snapshot 504 will not result in the loss of updates.

CONFLICT RESOLUTION

If a particular body of replicated data is propagated synchronously between every site containing the body of data, then no conflicts are possible. However, if the body of data is propagated asynchronously from even one site S1 to one other site S2, or if the data is contained in an updatable snapshot, then it is possible for a conflict to occur. This is true even if the same body of data is replicated synchronously from S2 back to S1 and synchronously replicated both to and from all other replication sites. Under these conditions, a conflict resolution mechanism is invoked when a conflict is detected, regardless of whether the propagation being performed is synchronous or asynchronous. Such a conflict resolution mechanism is described in Souder, the contents of which are incorporated herein by reference.

REPLICATION TECHNIQUES

Changes made by a transaction may be replicated at a destination site either by shipping the old and new data values to the destination site ("row or column level replication"), or by invoking at the destination site the same procedures that were invoked at the source site by the transaction that made the changes ("procedure level replication"). Both techniques of replication may be used for both synchronous and asynchronous replication, and are described in greater detail in Jain. When a body of data is replicated using row level replication at one site, then all sites that replicate the body of data are capable of using row level replication. Similarly, if a body of data is replicated using procedure level replication, then all sites that replicate the body of data are capable of using procedure level replication.

According to an embodiment of the invention, a user may specify configurations that mix replication techniques as well as replication modes. Thus, the system 200 of FIG. 5 may use synchronous row-level replication between sites 202 and 206, asynchronous row-level replication between sites 202 and 204, asynchronous row-level replication between sites 204 and 206, and synchronous procedure-level replication from site 502 to site 206. The present invention is not limited to performing replication using any particular type of replication technique.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for maintaining multiple copies of a body of data at multiple sites, the method comprising the steps of:
    detecting a change to a first copy of the body of data at a first site;
    in response to detecting the change to the first copy, performing the steps of:
        asynchronously propagating the change to a second copy of the body of data at a second site; and
        synchronously propagating the change to a third copy of the body of data at a third site.

2. The method of claim 1 wherein the step of synchronously propagating the change to the third copy comprises the step of making permanent the change to the first copy at said first site only after receiving verification that the change has been successfully made to the third copy of the body of data at the third site.

3. The method of claim 2 wherein the step of making permanent the change to the first copy at said first site is performed without regard to whether the change is successfully made to the second copy of the body of data at the second site.

4. The method of claim 3 wherein the step of making permanent the change to the first copy at said first site is performed prior to propagating the change to the second site.

5. A computer network comprising:
    a first site having a first copy of a body of data;
    a second site having a second copy of the body of data;
    a third site having a third copy of the body of data; and
    a replication mechanism which is configured to respond to changes being made to the first copy by synchronously propagating the changes to the second site and asynchronously propagating the changes to the third site.

6. The computer network of claim 5 wherein the replication mechanism is further configured to respond to changes being made to the second copy by asynchronously propagating the changes to the first site.

7. A method for replicating data in a computer system, the method comprising the steps of:
    maintaining a first copy of a body of data at a first site;
    maintaining a second copy of the body of data at a second site;
    synchronously propagating to said second site changes made to said first copy;
    asynchronously propagating to said first site changes made to said second copy.

8. The method of claim 7 further comprising the steps of:
    while said first site is operational, causing all new changes to said body of data to be initially made at said first site; and
    while said first site is not operational after a failure at said first site, causing all new changes to said body of data to be initially made at said second site.

9. The method of claim 8 further comprising the steps of, after the first site becomes operational again after a failure:
    applying to the first copy all changes that were made to the second copy while the first site was unavailable; and
    causing all new changes to said body of data to be initially made at said first site.

10. A method for maintaining an updatable snapshot at a first site that reflects data stored at a second site, the method comprising the steps of:
    periodically transmitting change information from the second site to the first site;
    in response to receiving the change information at the first site, revising the snapshot to reflect changes identified in the change information; and
    synchronously propagating to said second site changes made to the updatable snapshot at the first site.

11. The method of claim 10 further comprising the step of making changes made to the updatable snapshot permanent at the first site only after receiving confirmation that the changes were successfully made at the second site.

12. The method of claim 10 wherein the step of revising the snapshot includes the step of determining which changes in said change information apply to data that has been selected for said snapshot.

13. A computer-readable medium carrying sequences of instructions for maintaining multiple copies of a body of data at multiple sites, the sequences of instructions comprising instructions for performing the steps of:
    detecting a change to a first copy of the body of data at a first site;
    in response to detecting the change to the first copy, performing the steps of:
        asynchronously propagating the change to a second copy of the body of data at a second site; and
        synchronously propagating the change to a third copy of the body of data at a third site.

14. The computer-readable medium of claim 13 wherein the step of synchronously propagating the change to the third copy comprises the step of making permanent the change to the first copy at said first site only after receiving verification that the change has been successfully made to the third copy of the body of data at the third site.

15. The computer-readable medium of claim 14 wherein the step of making permanent the change to the first copy at said first site is performed without regard to whether the change is successfully made to the second copy of the body of data at the second site.

16. The computer-readable medium of claim 15 wherein the step of making permanent the change to the first copy at said first site is performed prior to propagating the change to the second site.

17. A computer-readable medium carrying sequences of instructions for replicating data in a computer system, the sequences of instructions comprising instructions for performing the steps of:
    maintaining a first copy of a body of data at a first site;
    maintaining a second copy of the body of data at a second site;
    synchronously propagating to said second site changes made to said first copy;
    asynchronously propagating to said first site changes made to said second copy.

18. The computer-readable medium of claim 17 further comprising instructions for performing the steps of:
    while said first site is operational, causing all new changes to said body of data to be initially made at said first site; and
    while said first site is not operational after a failure at said first site, causing all new changes to said body of data to be initially made at said second site.

19. The computer-readable medium of claim 18 further comprising instructions for performing the steps of, after the first site becomes operational again after a failure:
    applying to the first copy all changes that were made to the second copy while the first site was unavailable; and causing all new changes to said body of data to be initially made at said first site.

20. A computer-readable medium carrying sequences of instructions for maintaining an updatable snapshot at a first site that reflects data stored at a second site, the sequences of instructions comprising instructions for performing the steps of:

periodically transmitting change information from the second site to the first site;

in response to receiving the change information at the first site, revising the snapshot to reflect changes identified in the change information; and synchronously propagating to said second site changes made to the updatable snapshot at the first site.

21. The computer-readable medium of claim 20 further comprising sequences of instructions for performing the step of making changes made to the updatable snapshot permanent at the first site only after receiving confirmation that the changes were successfully made at the second site.

22. The computer-readable medium of claim 20 wherein the step of revising the snapshot includes the step of determining which changes in said change information apply to data that has been selected for said snapshot.

* * * * *